Dec. 16, 1941.    H. W. JONES    2,266,208
FLAME CUTTING METHOD AND APPARATUS
Filed Oct. 19, 1939    5 Sheets-Sheet 1

INVENTOR
HOMER W. JONES.
BY
ATTORNEY

Dec. 16, 1941.  H. W. JONES  2,266,208
FLAME CUTTING METHOD AND APPARATUS
Filed Oct. 19, 1939  5 Sheets-Sheet 2
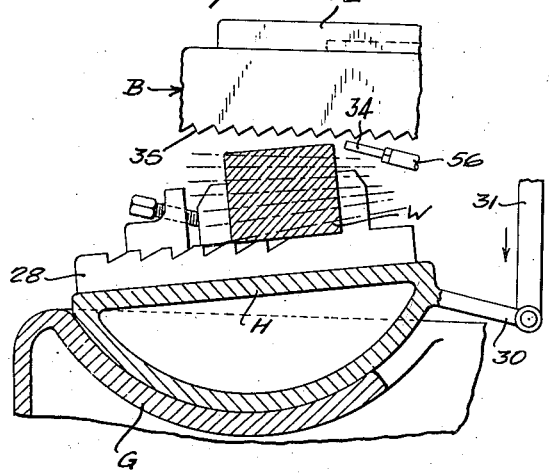
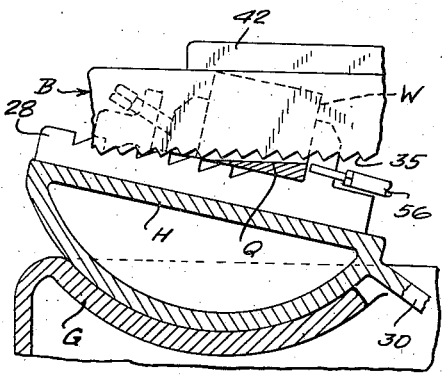
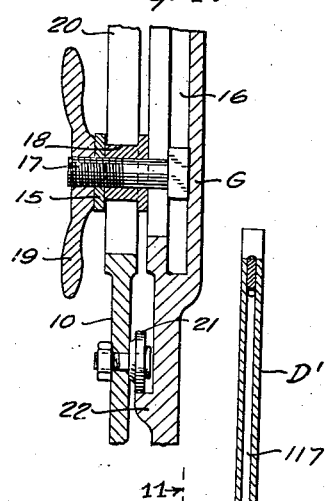
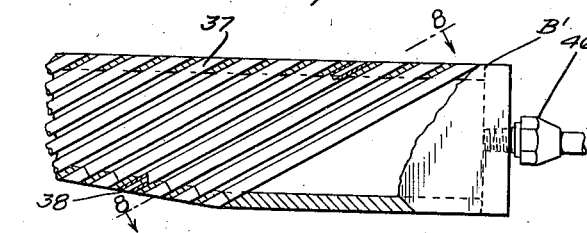
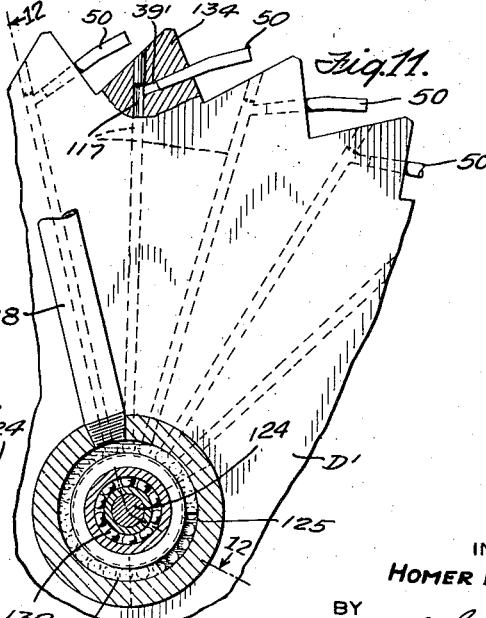
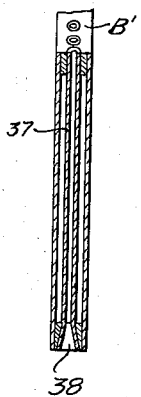
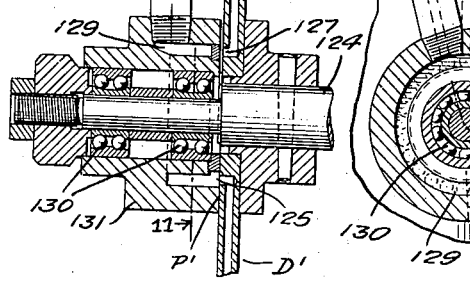
INVENTOR
HOMER W. JONES
BY
Ed Greenewald
ATTORNEY Dec. 16, 1941.  H. W. JONES  2,266,208
FLAME CUTTING METHOD AND APPARATUS
Filed Oct. 19, 1939  5 Sheets-Sheet 3
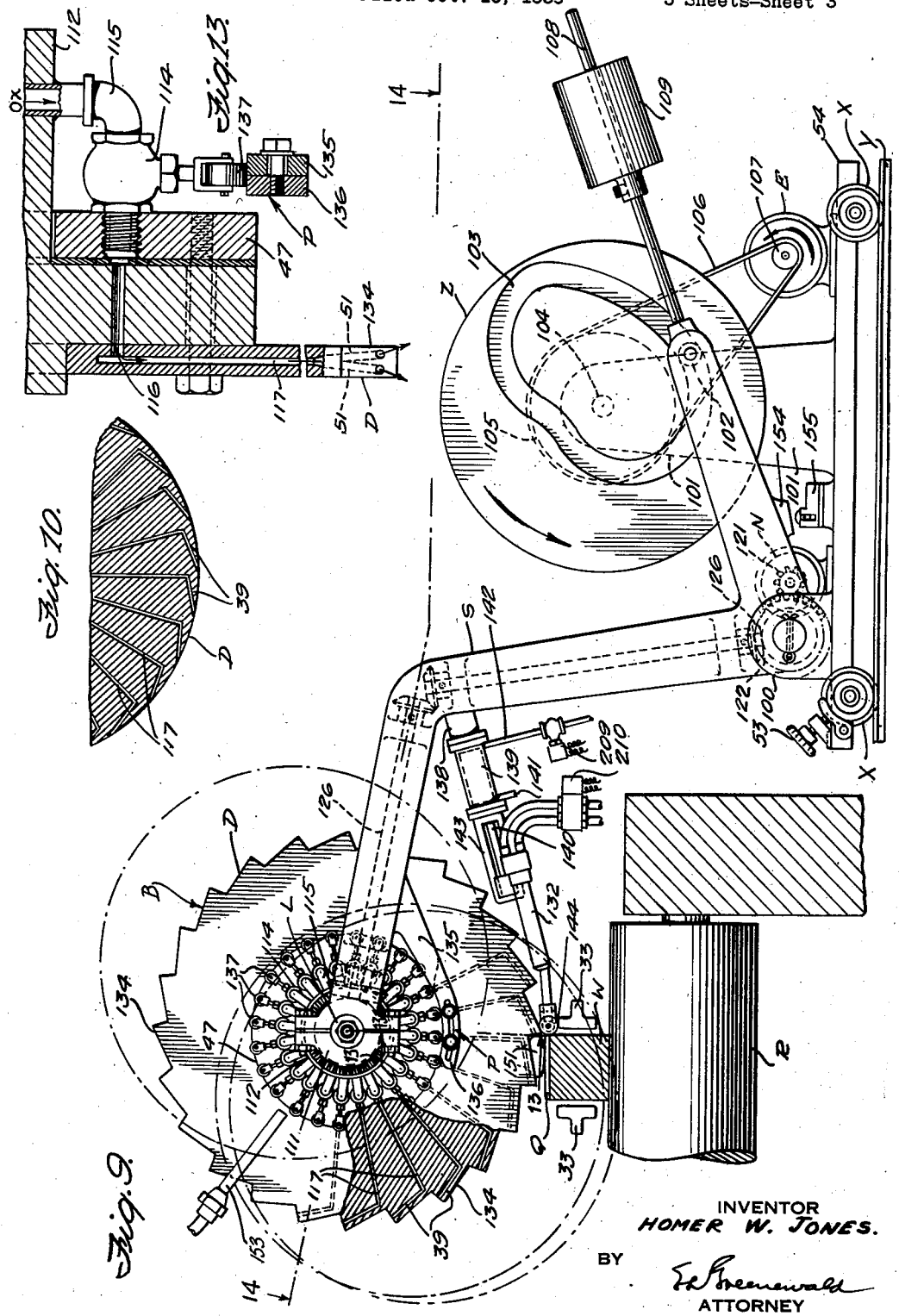
INVENTOR
HOMER W. JONES.
BY
Ed Greenewald
ATTORNEY

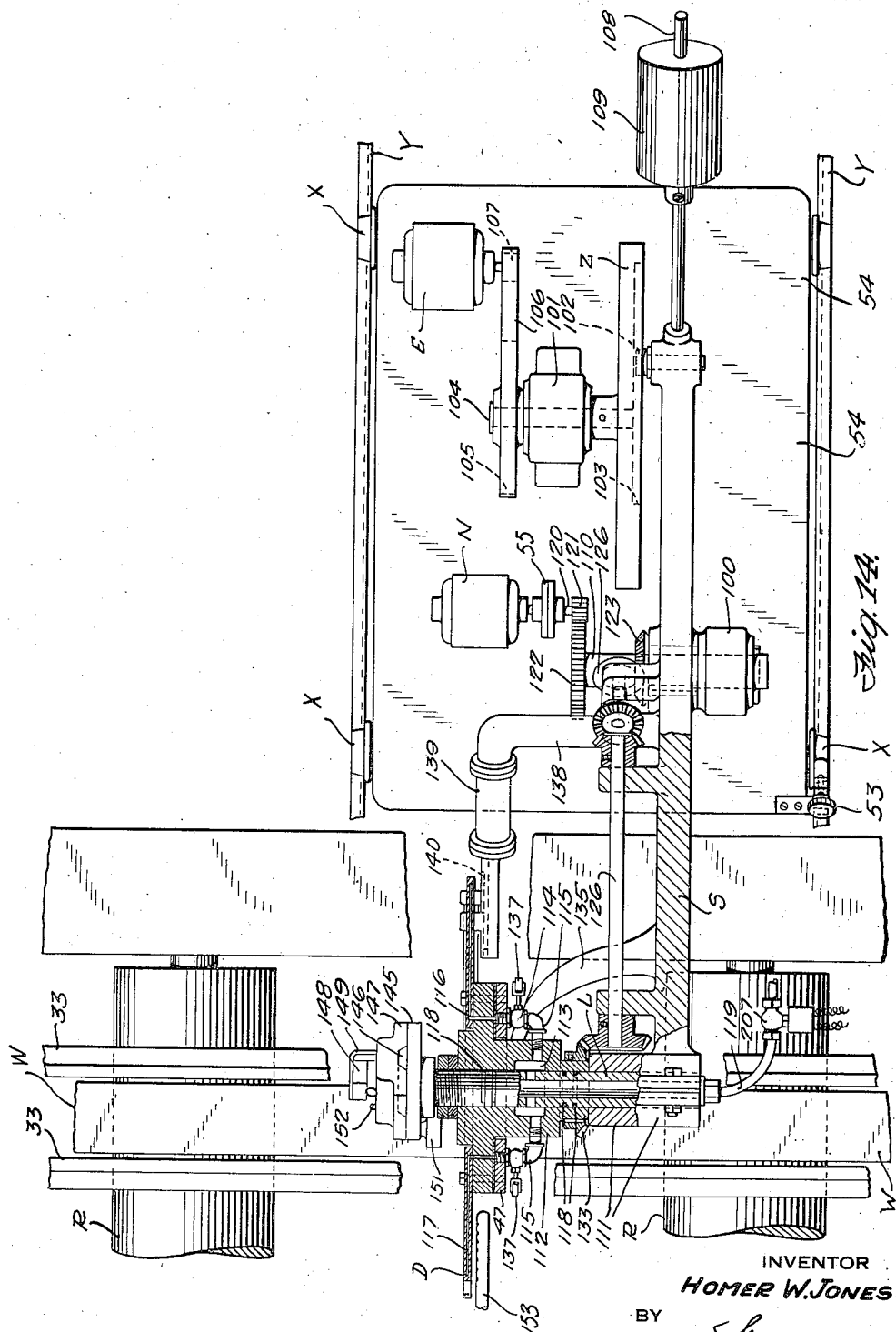

Dec. 16, 1941.  H. W. JONES  2,266,208
FLAME CUTTING METHOD AND APPARATUS
Filed Oct. 19, 1939  5 Sheets-Sheet 5

INVENTOR
HOMER W. JONES
BY
ATTORNEY

Patented Dec. 16, 1941

2,266,208

UNITED STATES PATENT OFFICE 2,266,208

FLAME CUTTING METHOD AND APPARATUS

Homer W. Jones, Westfield, N. J., assignor to The Linde Air Products Company, a corporation of Ohio Application October 19, 1939, Serial No. 300,158

25 Claims. (Cl. 148—9)

This invention relates to the art of cutting metal bodies and more particularly to improved methods and apparatus for the high-speed flame-cutting of ferrous metal bodies of relatively large cross section, such as steel ingots, blooms, billets, bars, beams, and channels.

The high-speed cutting of ferrous metal bodies is of special importance in large scale fabricating plants. An example of this is found in steel mills where billets, bars, and the like, must be cut into sections of uniform length during or between the rolling, drawing or similar operations. In all such cases a distinct need heretofore has existed for a method and apparatus for efficiently severing metal at such a speed as to keep pace with the rolling and like operations. The cutting of large metal bodies in steel mills ordinarily has been accomplished by power shearing or by mechanical sawing. Both methods have disadvantages. For example, shearing requires the use of relatively heavy and expensive machinery, and the operation produces excessive wear on the shearing blades, especially where the metal is cut while at a high temperature. Consequently, such blades have a short useful life and require frequent replacement. A more serious disadvantage of the shearing process lies in its detrimental action in forming a burr along the sheared face of the metal body, which burr becomes more pronounced as the shearing blade becomes worn.

When it is desired to produce a cut surface having a better finish than can be obtained by shearing, it is customary to saw the body, usually with a rapidly rotating metal disk. However, excessive wear on the cutting edge of the disk necessitates frequent servicing, as by sharpening or replacing the saw blade, and the method is inherently slow for cutting cold metal, and impractical for cutting hot metal or thick sections. In addition, the method is dangerous in that the cutting disk may fly to pieces because of its extremely high speed of rotation and the great stress to which it is subjected.

By means of the present invention it is possible to form a severing cut having a surface quality equal or superior to that produced by a shearing blade, without the formation of the usual objectionable burr The equipment employed, comprising chiefly a moving headpiece for projecting a series of oxygen jets, is considerably less cumbersome and expensive than that required for a similar shearing operation, and may be operated at less cost. By employing the thermo-chemical severing process and apparatus of the present invention, severing cuts may be made at speeds equal to or in excess of those obtainable by friction saw blades or disks, without the attendant hazardous operation or excessive wear. The speed of all moving parts is maintained at a minimum, and there is no actual physical contact between the moving headpiece and the work to be cut; as a consequence, substantially no wearing of the cutting device occurs.

Accordingly, the principal objects of this invention are: to provide improved methods and means for cutting relatively thick ferrous metal bodies, substantially free of the disadvantages of previously known cutting methods and devices; to provide thermo-chemical methods and apparatus for rapidly forming severing cuts by means of flame-cutting jets applied to the metal in rapid succession; to provide methods of and apparatus for applying oxidizing cutting jets of low capacity recurrently against the metal body and along the cutting line; to provide methods of and apparatus for applying flame-cutting jets progressively along the metal body to form a kerf therein while progressively advancing the jets into the kerf as the kerf is formed; to provide a cutting method and apparatus for advancing or sweeping a series of aligned oxidizing jets in an arcuate or peripheral path along a surface of a metal body, and for interrupting the flow of oxidizing gas to the jets when such jets successively project beyond the end of the path of travel; and to provide methods of and apparatus for sweeping forwardly - inclined flame-cutting jets successively along the path of travel, to remove successive thin layers from the forward wall of the kerf. These and other objects of the present invention will become apparent from the following description and the accompanying drawings.

In the drawings,

Fig. 4 is a sectional view taken on the line 4—4 of Fig. 1;

Fig. 5 is a fragmentary side view of a portion of the apparatus shown in Fig. 1, showing the start of a cutting operation;

Fig. 6 is a view similar to Fig. 5 but showing the position of the parts near the end of a cutting operation;

Fig. 7 is a fragmentary elevational view, partly in section, of an oxygen-projecting blade adapted for use with the present invention;

Fig. 8 is a sectional view taken on the line 8—8 of Fig. 7;

Fig. 9 is a side elevational view, partly in section, of a modified apparatus embodying the present invention;

Fig. 10 is a fragmentary sectional view of a rotatable oxygen-projecting disk of a type adapted for use with the apparatus shown in Fig. 9;

Fig. 11 is a fragmentary sectional view of a modified form of cutting disk taken on the line 11—11 of Fig. 12;

Fig. 12 is a vertical cross-sectional view of the rotatable blade for disk taken on the line 12—12 of Fig. 11;

Fig. 13 is a sectional view taken on the line 13—13 of Fig. 9;

Fig. 14 is a plan view, partly in section, of the apparatus shown in Fig. 9;

Figure 17:
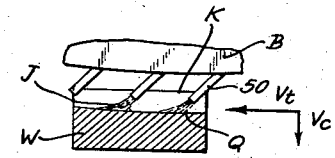
Figure 18:
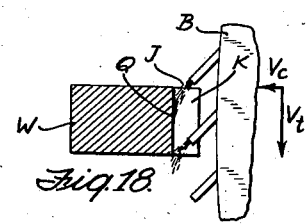
Figure 19:
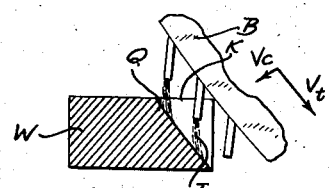

Figs. 17, 18, and 19 are diagrammatic sketches showing several different ways of feeding the cutting jets to the work.

The present invention comprehends traversing a straight line of cut with successive aligned jets of oxidizing gas at such a high traversing velocity that incomplete penetration of the jets through the body is obtained, the effectiveness of the cutting action being enhanced considerably by inclining the jets forwardly with respect to the path of travel. The present method of flame-cutting metal, that is, with oxidizing cutting jets, is generally applicable to all metals which may be severed by the ordinary oxy-fuel cutting blowpipe, but the operation distinguishes from ordinary flame-cutting in several material respects. For example, with the present method, a series or chain of jets are applied to and swept along the metal in rapid succession, at a traversing velocity far in excess of normal flame-cutting speeds, the cut being generated substantially at right angles to the traversing or sweeping motion of the jets. Where bodies of appreciable thickness are to be cut, more efficient results are obtainable with the present method by progressively feeding the jets toward and within the body as the cut progresses, the jets sweeping through the kerf so as to completely traverse the front or forward wall thereof, while generating the desired cut by grooving, cutting, or otherwise consuming successive relatively thin layers therefrom. The successively-applied oxygen jets progressively remove metal from the body in layers, somewhat in the manner of a friction saw, so that the method may be and sometimes is referred to as oxygen-sawing, though it will be noted that the metal is removed thermo-chemically by the exothermic reaction of the oxygen jets and the metal along the cutting line; no actual abrasive action nor physical contact occurs between the oxygen-projecting means and the work. The respective jets preferably operate cyclically, the flow of oxidizing cutting gas being turned on automatically as each successive jet reaches the kerf, at the beginning of each cutting stroke, and being turned off automatically after traversing the kerf, at the end of each cutting stroke. Alternate oxygen jets may be inclined slightly in opposite directions transversely of the path of travel, or the jets may be discharged from diverging orifices so as to act on the side walls of the kerf sufficiently to widen the same and provide enough clearance to admit the cutting nozzles or the oxygen-saw headpiece.

The general nature of the invention may be better understood by referring to the drawings, and more especially to Figs. 1, 9, and 17 through 19, which disclose different forms of oxygen-sawing apparatus and various modes of applying the same to the work. The invention makes use of a relatively thin headpiece or blade B, resembling somewhat the blade of a saw, but having a series of substantially aligned closely spaced discharge orifices or nozzles provided along the usual toothed cutting surface, from which orifices jets of cutting oxygen may be discharged. The blade B is positioned adjacent to a metal body or workpiece W with the central plane of the blade aligned with the central plane of the cut or kerf K to be formed in the metal, and relative motion is provided between the two, such that the oxidizing or flame-cutting jets J are applied successively against and progressively along the metal to form a kerf therein. The motion of the saw relative to the work may be continuous in a single direction, or it may be oscillatory, that is, in alternate directions, but in either case the cutting jets J are applied in a chain-like series or catenation, successively and preferably recurrently along the kerf. Where the oxygen-saw blade B and work W are oscillated or reciprocated with respect to one another, the amplitude of oscillation preferably is sufficient to sweep each jet completely along or through the entire kerf, so that each jet removes a thin layer from the entire length of the advancing edge or front wall Q of the kerf during each traversing motion. However, the amplitude of oscillation may be adjusted so as to sweep each of the jets along only a portion of the kerf, in which case the blade reciprocates over a path at least equal to the space between adjoining jets. Valve mechanism P regulates the flow of oxidizing gas to only such successive groups of discharge orifices as are in a position to project jets against the metal body W. Accordingly, the oxidizing gas is turned on to continuously-successive series of discharge orifices as they approach the body, and the flow is interrupted as the jets pass beyond the metal body.

The orifices or nozzles are arranged substantially in the central plane of the blade B so that a kerf with practically parallel walls is formed. However, in order to widen the kerf sufficiently to admit the blade B, alternate jets J may be located on opposite sides of the central plane of the blade B, or inclined slightly outward in opposite directions from the central plane. Such transverse staggering of the jets is of such slight magnitude that for the purpose of the present description they may be considered as substantially aligned with the central plane of the blade or headpiece B. Similar widening of the kerf may be obtained by having one or more of the cutting-oxygen nozzles provided with a flared or divergent discharge orifice, thereby allowing such jets to spread as they emerge, and to react with the side walls of the kerf, widening the same.

Distinctly better cutting may be obtained by inclining the nozzles or discharge orifices forwardly at an appreciable angle to the work surface or front of the kerf during the traversing movement of the jets, substantially in the central plane of the blade. Where the process is practiced with a horizontally reciprocating blade, the nozzles may project downwardly and forwardly at an angle preferably between 15° and 60° with the horizontal. If the blade comprises a rotatable disk, the nozzles may be inclined at a similar angle to tangents extending from the periphery at the respective nozzle positions.

The position of the cutting jets and their velocities relative to the work is illustrated in Figs. 17, 18, and 19. With the present method, the nozzles traverse the kerf at relatively high speed, that is, at least 50 feet per minute. Laboratory-machine tests suggest that the cutting speed, $V_c$ or rate at which the front of the kerf is advanced, varies as a function of the traversing velocity $V_t$. Cutting speeds of greater than 75 inches per minute have been obtained on 4" thick steel plate with traversing velocities of over 700 feet per minute. Since the cut is propagated substantially at right angles to the traversing motion of the jets, the cutting speed $V_c$ is substantially independent of the thickness of the workpiece. Of course, when wider bodies are to be cut, provision must be made to permit the jets to project against the metal during a longer period, so as to act on the metal along the entire kerf K. At the high rates of jet travel $V_t$ employed, especially with forwardly inclined resulting high-velocity jets, high pressure oxygen, at between 100 and 200 pounds per square inch, may be used without the jets penetrating entirely through the metal, as would otherwise occur with conventional flame-cutting. The jets remove a thin layer from the advancing forward wall or front of the kerf and ordinarily are deflected forwardly along the kerf in the direction of the jet movement, carrying along with them the liquefied products of combustion and molten metal.

The present method is intended primarily for cutting bodies initially at a high temperature, for example, between 1500° and 2000° F., but is equally well adapted for the cutting of cold bodies if sufficient local preheating is provided. In Figs. 9 and 14, the work W designates a hot billet passing between guides 33 from the rolling mill while being conveyed to the cutting zone on rollers R. Even where hot billets, or the like, are cut by the present method while in an incandescent state, it may be found desirable to provide additional localized preheat, either adjacent to the starting edge of the kerf, or along the kerf progressively with the cutting operation. It has been found that where the oxygen-sawing operation is properly started, and the metal is initially in a heated condition, no additional preheat is ordinarily needed to sustain the cut, as the heat of reaction and the resulting flow of molten material forwardly along the kerf cooperate to maintain the adjoining parts above the combustion or ignition temperature.

The catenated jets progressively generate the desired kerf by attacking successive thin layers along the entire advancing forward wall Q. Greater efficiency is obtained if the nozzles are fed or moved toward the work W and within the kerf K at the cutting speed $V_c$, so as to maintain substantially a constant distance between the nozzles and forward wall or front of the kerf. This feeding motion may be continuous, or it may occur intermittently to advance the nozzles in predetermined increments.

Actual structural details of two general types of apparatus capable of carrying out the improved process will best be understood from the following detailed description and the figures of the accompanying drawings. Figs. 1 through 8 illustrate an apparatus employing a straight reciprocating blade, resembling somewhat in appearance a power-driven hacksaw. Figs. 9 through 15 illustrate a modified apparatus employing a rotatable blade or disk adapted to project oxygen jets from its periphery, but which otherwise resembles somewhat a power-driven circular saw. The underlying principles of the invention, which involve a chain-like series of aligned flame-cutting jets in rapid succession to, and progressively and preferably recurrently along the kerf, are present in both forms of the apparatus, the principal distinction between the two forms residing in the mode of applying the jets to the metal body or workpiece W. In the one case the oxygen projecting blade B is oscillated or reciprocated with respect to the work, and jets are applied intermittently, preferably during the forward stroke only, though two adjacent sets of nozzles may be employed, directed forwardly and rearwardly respectively, the respective sets functioning alternately during the forward and return strokes. In the other case the jets are projected from orifices spaced about the periphery of a disk continuously rotating in a single direction.

Referring to Figs. 1 to 8, one form of apparatus embodying the invention comprises a base G in which is mounted a motor M, a variable speed transmission T and a cam C driven by the motor M and the transmission T. The cam C is adapted to actuate a saw frame F through a rocker arm 10 and a link 11, imparting to the frame F and to the blade B affixed thereto a reciprocating motion with respect to the metal workpiece W. Movably mounted in the base G is a work-holding support H.

Figure 2:
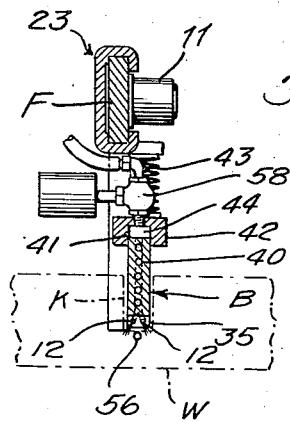
Fig. 2 is a sectional view taken on the line 2—2 of Fig. 1.

The blade or headpiece B which is fixed to the frame F by bolts 36, has a plurality of aligned passages 40 drilled therein adapted to convey cutting oxygen from a valving chamber 41 of a floating slide valve 42 mounted on the top of the blade B, to the bottom or advancing wall of the kerf made by the apparatus. A spring 43 presses at one end against a supporting member 23 which is slidably mounted on, and vertically adjustable along a slide 24 mounted on the base G, and at the other end against the floating slide valve 42, thereby holding the slide valve 42 tightly in contact with the blade B to inhibit leakage of oxygen. The valving chamber 41 is provided with a slidable member 44 which permits an adjustment of the length of the chamber 41 and of the number of angular passages 40 that may be opened to the valving chamber to accommodate work of various widths. Only the passages actually in line with the work W discharge cutting oxygen. A locking screw 45 secures the slidable member 44 in any desired position. The lower ends of the passages 40 are preferably provided with two outwardly inclined oxygen outlets 12, as shown in Fig. 2, to insure the formation of a kerf wider than the blade B. Preferably, a series of teeth 35 are cut in the blade B to secure best oxygen and slag flow, and the blade B is preferably cooled, as by water or other suitable fluid conducted through inlet connections 46, passages 48, and 49, respectively, to outlet connections 52.

The saw frame F is mounted within the supporting guide member 23 and is given a reciprocating or oscillating movement through suitable linkage by the cam C, the speed of which is varied by means of a control unit 68 attached to the transmission T and adjusted by a shaft 69 extending outside the base G and provided with a handwheel 70. The cam C is attached to a power take-off shaft 72 of the transmission T and is provided with a groove or track 13. A rocker arm 10 is fulcrumed to the base G above the cam C, its upper end being pivotally connected to the frame F through the link 11. A roller 14 mounted on the lower end of the rocker arm 10 engages the track 13 of the cam C, so that as the cam C is driven in a clockwise direction by the motor M, an oscillating motion is imparted to the rocker arm 10, the link 11, and the frame F. The track 13 of the cam C may be so shaped that during the greater part of each revolution of the cam C, the frame F moves forwardly while only a small portion of each revolution is required to return the frame F to the starting position. Accordingly, the blade B is fed forwardly across the work, preferably at substantially uniform velocity, and is returned at a higher velocity, or at any convenient rate regulated by the design of the cam C.

Figure 1:
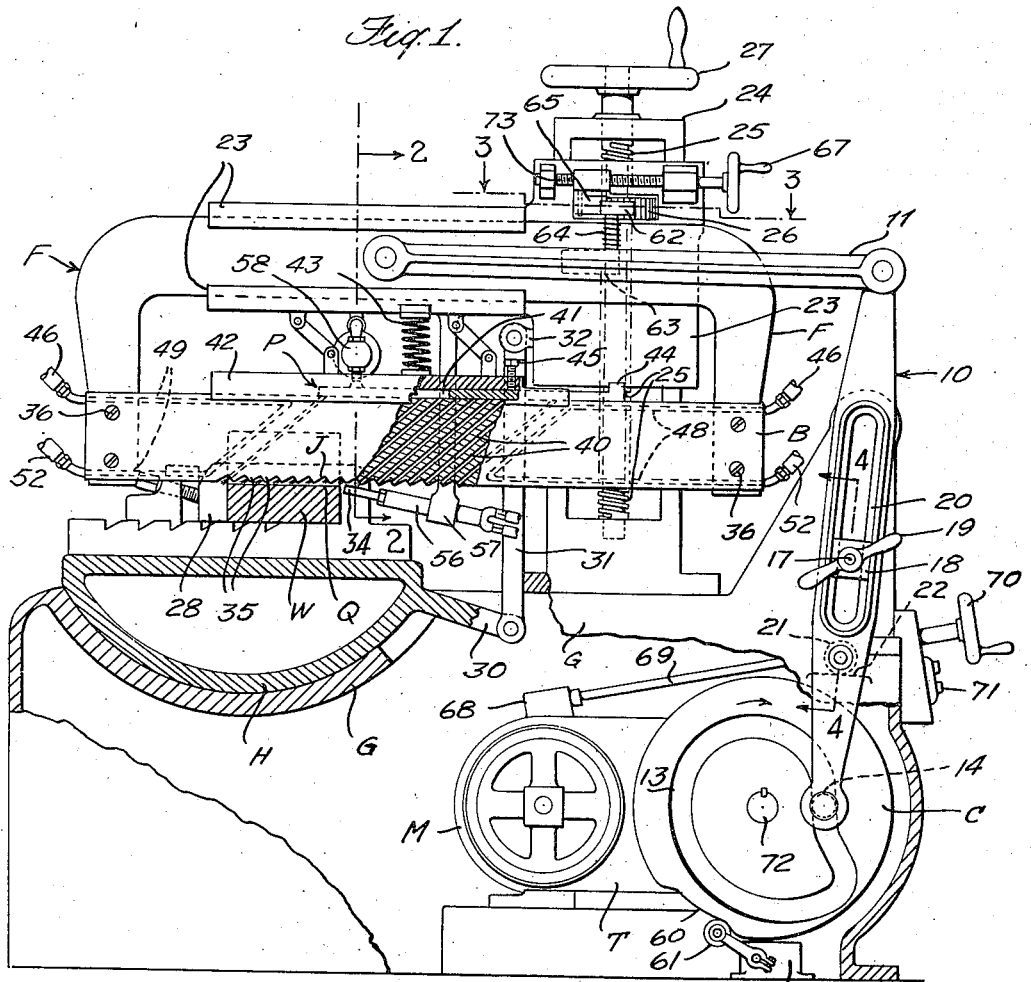
Fig. 1 is a side elevational view, partly in section, of one form of apparatus embodying the invention.

The length of travel or the stroke of the frame F may be varied by adjusting the position of the rocker arm pivot or fulcrum, as may be seen in Fig. 4. The base G extends upwardly behind the rocker arm 10 where it is provided with a T-groove 16. A bolt 17, slidably held in the groove 16 extends outwardly through an adjoining slot 20, formed in the rocker arm 10. The bolt 17 is guided by a slide block 18, fitted on the bolt 17 and engaging the walls of the slot 20, being held in position by a washer 15, and a wing nut 19 which is threaded on the bolt 17. The bolt 17, about which the rocker arm 10 pivots, may be moved to any position along the groove 16 and slot 20 and may be clamped by tightening the wing nut 19, thus making it possible to increase or decrease the stroke of the frame F. When the groove 16 and slot 20 are aligned as shown in Fig. 1, the frame F always occupies the same initial position regardless of the length of the stroke. A roller 21, attached to the rocker arm 10, rests upon a projection 22 of the base G and holds the arm 10 in place when the wing nut 19 is loosened.

Figure 3:
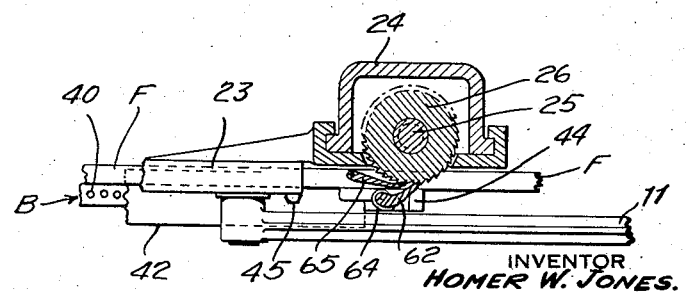
Fig. 3 is a sectional view taken on the line 3—3 of Fig. 1.

In order that the frame F may be adjusted vertically to accommodate work of various thicknesses, a vertical slide 24 is provided with a coarse-pitch screw 25 which is threaded through a ratchet nut 26, as shown in Figs. 1 and 3. The upper end of the screw 25 is provided with a handwheel 27 for manually adjusting the height of the frame F and the supporting member 23. Substantially the entire weight of the frame F and the supporting member 23 rests upon the ratchet nut 26, the teeth of which project through an opening in the supporting member 23. As the vertical hand adjustment wheel 27 is rotated, the ratchet nut 26 threads on the screw 25, causing the frame F and the supporting member 23 to be raised or lowered.

When the machine is in operation, each forward stroke of the blade B causes the removal of a thin layer of metal from the workpiece W, so the blade B is preferably lowered an equivalent amount. Automatic means for so lowering the blade are best shown in Figs. 1 and 3. Fixed to the frame F is a bracket 63 on which is pivotally mounted a pawl 62. A spring 64 causes the pawl to engage the ratchet nut 26 threaded upon the screw 25, so that during each return stroke of the blade B the ratchet nut 26 is partially rotated about the screw 25 thus lowering the blade. To change the vertical feeding rate of the blade, the degree of movement imparted to the ratchet nut 26 by the pawl 62 is adjusted by means of a mask 65 mounted upon a horizontal lead screw 73, rotatably secured to the supporting member 23. A handwheel 67 is provided for rotating the screw 73 to move the mask 65 across the teeth of the ratchet nut 26, thereby controlling the number of teeth exposed for engagement with the pawl 62, and consequently the distance the blade is advanced after each cutting stroke.

A preheating blowpipe 56 is mounted in any convenient manner so as to heat a localized zone of the work W; the blowpipe may be secured to a bracket 57, connected to the supporting member 23 so that as the frame F is raised or lowered by rotating the handwheel 27, the relationship between the preheating nozzle 34 of the blowpipe 56 and the blade B remains unchanged. Fuel gas and oxygen are supplied to the preheating blowpipe 56 by hoses connecting with respective supply sources, and the flow of gases is regulated by valves in the usual manner.

The workpiece W to be cut is held by a suitable clamp or vise 28 mounted upon the workholding support H in the base G under the blade B. It should be particularly noted that, while the outward appearance of the blade B may resemble the blade of a conventional hacksaw, the teeth 35 of the blade do not come into actual contact with the work. Better results may be obtained if the work-holding support H is tiltably mounted in the base G. A projection 30 of the support H is pivotally connected to a link 31, the upper end of which is pivotally mounted on a projection 32 of the supporting member 23. Thus, raising the supporting member 23 at the start of a cut tilts the work in the manner shown in Fig. 5. As the cut progresses, the gradual lowering of the supporting member 23 tilts the work in the opposite direction, until it reaches the final position, substantially as shown in Fig. 6. As the cut nears completion, without any tilting motion imparted, a tendency may arise for the cutting operation to be interrupted at points remote from the preheating blowpipe because of loss of preheat, leaving an uncut fin at the bottom of the kerf capable of damaging the blade B. By applying the tilting motion to the work as described, the remote portions are cut before such tendency arises, leaving only a small zone adjacent to the preheating blowpipe for the final pass, which may be cut without difficulty.

Cutting oxygen is supplied to the slide valve chamber 41 by a solenoid valve 58, controlled to permit oxygen to flow during only the forward stroke of the blade B. The valve 58 may be actuated by a switch 59, operated in any convenient manner, as by a roller 61 contacting the periphery of the cam C. At the start of the forward stroke of the blade B, the roller 61 rides out of a recess 60 onto the outer periphery of the cam C, thereby actuating the switch 59 and the solenoid valve 58 to turn on the oxygen supply to the valving chamber 41.

To operate the machine, the position of the frame F is first manually adjusted by means of the handwheel 27 until the blade B is directly over the work W, and the preheat gases issuing from the blowpipe 56 are ignited. When the metal is properly preheated, the motor M is started by depressing the push button of a motor-switch 71 which also completes the electrical circuit to the solenoid valve 58, turning on the cutting oxygen. The cam C rotates, causing the frame F and blade B to reciprocate over the work W, the frame being lowered by means of the screw 25, as the cut progresses. As has already been described, the cutting oxygen is permitted to flow only during the forward stroke of the blade B. During each forward stroke the aligned flame-cutting jets are projected successively along the kerf, grooving out layers and sweeping the molten end-products forwardly along the cut. The operation of the machine continues automatically until the workpiece W is severed, at which time the motor M is stopped by manual or automatic operation of the switch 71.

Figs. 7 and 8 disclose a modified hollow oxygen-saw blade B' for use with the apparatus shown in Fig. 1, having inclined substantially parallel oxygen conducting tubes 37 aligned with the central plane of the blade B'. The tubes extend through and are hard-soldered within the upper and lower walls of the blade to provide a chamber about the tubes for the circulation of cooling fluid, admitted at the inlet connection 46. The upper ends of the tubes 37 are ground smooth and flush with the top edge of the blade B' to provide fluid-tight connection with the slide valve 42 when the blade is mounted in operative position. The respective tubes are preferably flared at the discharge orifices 38, as by reaming, to permit the jets to diverge upon issuing therefrom so as to form a kerf wide enough to admit the blade B'. The bottom edge of the blade may slope upwardly toward the front end to provide additional room for the forward flow of slag, and to cause successive discharge orifices to be advanced progressively nearer the advancing edge Q of the kerf. Although the discharge ends of the tubes 37 may extend below the lower edge of the body of the blade B' to form projecting nozzles, the tubes are shown flush with the lower edge, the lower edge is arranged to slope upwardly, as shown in Fig. 7, and the downwardly projecting teeth shown on the blade B in Fig. 1 may be omitted. The teeth are mainly useful in providing space for the flow of slag, which space is amply provided in the modification of Fig. 7 by the upwardly sloping lower edge.

Referring particularly to Figs. 9 through 15, another form of apparatus embodying the invention comprises a platform 54 which may be permanently fixed in position, or provided with wheels or rollers X for rolling engagement with tracks Y. A brake 53 may lock the platform in position by engaging one or more wheels X. If desired, the platform 54 may comprise a motor-driven carriage of the general type disclosed in J. H. Bucknam and A. J. Miller Patent 2,183,605 dated December 19, 1939, allowing the apparatus to be propelled relatively to the work. The saw blade comprises a rotatable disk D mounted on the platform or carriage 54 in any convenient manner. Pivotally mounted on an ear 100 of the platform 54 is a bracket member S. A stationary hollow shaft L is transversely mounted at one extremity of the member S for rotatably receiving the disk D. A roller 102 mounted at the other end of the bracket member S engages a cam Z, rotatably mounted on a pedestal 101 of the platform 54. The disk D is whirled by a motor N, and the cam Z is driven by a motor E, both mounted on the platform 54.

As may be best seen in Figs. 9 and 14, the hollow shaft L is secured at the left-hand extremity of the member S by means of a clamping collar 111. A hub 112 for detachably receiving the disk D, is rotatably mounted on the shaft L, and is provided with a central chamber 113 forming an annular oxygen manifold about the shaft L, communicating with the oxygen supply hose 119 through the bore of the hollow shaft L. Sealing rings 118 extend about the shaft L on opposite sides of the chamber 113 to form a fluid-tight seal with the hub 112. The disk D is provided with a plurality of generally radially extending passages 117, preferably aligned with the central plane of the blade or disk D and having discharge portions 39 extending substantially tangentially through the teeth 134 at the periphery of the disk D inwardly to the respective passages 117.

Valve means P are provided to regulate the flow of oxygen from the manifold 113 to a limited number of the passages 117 located within an arc on the disk D, long enough at the periphery to extend entirely along the desired kerf. As shown in Figs. 9, 13, and 14, a valve 114 is provided for each of the passages 117 so as to permit the flow of oxygen only when each of the respective passages is in the cutting position adjacent to the work. The valves are mounted about the periphery of the hub 112 and are connected with the annular manifold as by means of tubing 115. The outlet from each of the valves 114 is threaded within an annular mounting plate 47, sealed against a flange of the hub 112. Oxygen passing through the valves 114 is conducted to the respective passages 117 by conduits 116. Adjustable mechanism is provided to open the valves sequentially to permit flow of oxygen to the passages 117 when the discharge portions 39 come adjacent to the work. As shown in Fig. 9 an arm 135 projects from the bracket S toward the disk D, which arm terminates in an adjustable curvilinear cam 136 underlying the valves 114 for engagement with a roller 137 mounted within the bifurcated end of each of the respective valve stems. The cam 136 engages successive rollers 137 as the disk D rotates causing the stems to be depressed and the valves to open. The cam 136 is adjustable as shown in Figs. 9 and 13 to vary the arc along which the valves are open, and consequently the distance at the periphery over which the oxygen jets are projected. As the rollers reach the end of the cam 136, the stems return to the normal closed position. With the valve arrangement disclosed, the flame-cutting jets are successively interrupted as soon as they have completed the traversing movement over the work, no oxygen being permitted to flow during the remainder of the cycle when the disk returns the respective nozzles or discharge passages to the beginning of the cutting position.

The disk D rotates about its own axis preferably at adjustable speeds. As shown in Fig. 14 a slip coupling 55 transmits rotary motion from the motor shaft 120 to a driving pinion 121, which in turn engages a driving gear 122 mounted on a shaft 110 serving also as a pivot pin for the bracket member S. A bevel gear 123 secured on the shaft 110 transmits rotary motion to the disk D through a suitable transmission mechanism such as a flexible shaft or bevel gearing 126 extending along the member S and engaging a bevel gear 133 keyed to the hub 112. The motor N is preferably an adjustable speed motor by means of which the velocity of the disk D may be controlled. The coupling 55 is adapted to slip at the slightest overload such as might occur when one of the teeth 134 accidentally strikes the work W, to thereby prevent damage to the disk.

Roller 102 engages the walls of a cam track 103 formed in the cam Z so as to pivot the bracket S and raise and lower the disk D as the cam Z revolves. Thus, during each revolution, the cam Z feeds the disk D to the workpiece W, advances a cut therethrough, and returns the disk to its initial position ready to make another cut. A shaft 104 for the cam Z passes through the pedestal 101 and is driven by the motor E as by means of a belt 106 which extends from the driving pulley 107 to the cam shaft pulley 105. A counterweight 109 is slidably mounted on an extension 108 of the bracket S to help balance the bracket and thereby decrease the load sustained by the roller 102.

If the workpiece W is not already at the ignition or kindling temperature, additional localized preheat may be provided by means of one or more blowpipes 132 mounted in any convenient manner with respect to the work, preferably so as to direct the preheat against the starting edge, either in alignment with the kerf, or on opposite sides thereof. As shown in the drawings, the blowpipe 132 is mounted on the piston rod 140 of an air cylinder 139 secured to the member S by means of an arm 138. The motion of the blowpipe 132 and the piston rod 140 is guided by a slideway 143, in response to the movement of the piston as air or other suitable fluid under pressure is introduced to either end of the cylinder through connections 141 and 142, respectively. A guide wheel 144 may be mounted adjacent to the forward end of the blowpipe 132 for engagement with the work W so as to maintain a predetermined distance between the work and the preheating nozzle. A solenoid valve 210 controls the flow of preheating gases to the blowpipe 132.

Figure 15:
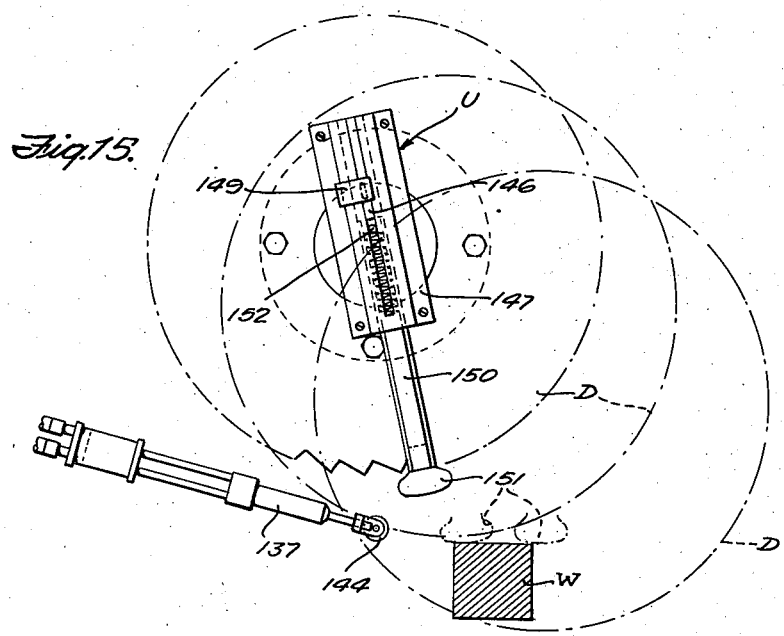
Fig. 15 is a diagrammatic elevational view of a portion of the apparatus shown in Fig. 9, showing various positions of a rotatable cutting disk during operation.

Threadedly mounted on the end of the stationary shaft L is a vertical position detector U, best seen in Figs. 14 and 15, which assists in determining the location of the disk D for the starting position, automatically stops the advancing disk when it reaches the starting position, turns on the gases to the preheating blowpipe, and moves the blowpipe into operative relation to the work W by opening a valve 209 admitting air to the cylinder 139. The detector U comprises a block 145 and cover plate 147 provided with a slot 146. A limit switch 148 is secured to the block 147 by means of a bracket 149. Slidably mounted within the slot 146 is a downwardly projecting arm 150 parallel to the plane of the disk D, having its lower end in the form of a shoe 151 adapted to engage the work W before the disk D reaches the cutting position, as shown in Fig. 15. A projection 152 on the arm 150 is adapted to actuate a limit switch 148 when the arm 150 is telescoped within the slot 146 by the continued downward movement of the disk D after the shoe 151 engages the work. The limit switch 148 stops the feed motor E preparatory to making the cut when the disk D reaches the starting position, and at the same time turns on the preheating gases to the blowpipe 132 so they may be ignited, and admits air to the cylinder 139 through passage 142, thereby propelling the blowpipe forwardly until the wheel 144 engages the work. When the cut is completed, the cam Z returns the disk D to its initial position, as already explained, by lowering the right side of the member S, and a projection 154 provided on the member engages and opens a limit switch 155, thereby simultaneously shutting off the preheat gases, the cutting oxygen, the feed-drive motor E and the saw-drive motor N, to completely stop the machine.

Figure 16:
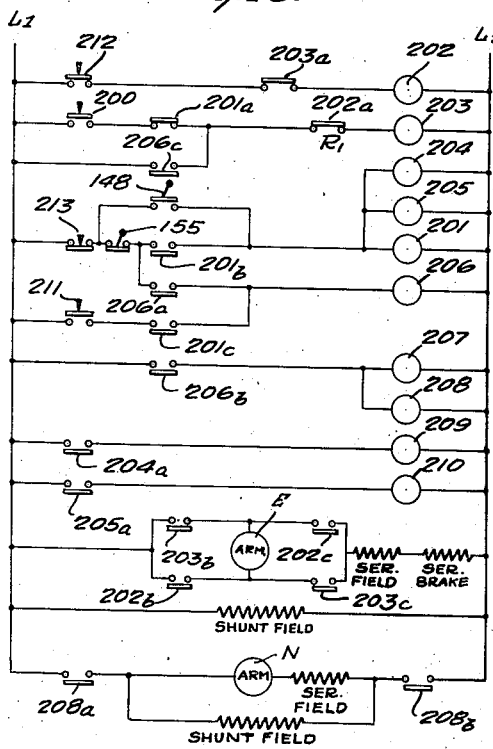
Fig. 16 is a wiring diagram of the apparatus shown in Fig. 9.

The operation of the embodiment of the invention just described is automatic and may best be explained with reference to the wiring diagram shown in Fig. 16. Current is supplied through the lines $L_1$ and $L_2$. At the start of a cutting cycle, the disk D is in its uppermost position, about six inches above the work W. To start operation, the operator depresses a normally open push button 200, which energizes a relay 203 having three sets of contacts 203a, 203b, and 203c. Contacts 203b and 203c are normally open, and are closed only when the relay 203 is energized, while contact 203a is normally closed, opening only when the relay 203 is energized. Thus, when the relay 203 is energized, the contacts 203b and 203c connect the motor E with $L_1$ and $L_2$, thereby operating the motor in a forward direction to feed the disk D downwardly to the work W by means of the cam Z. The controlling electrical circuit is from the line $L_1$, through the depressed push button 200, through normally closed contacts 201a and 202a, and through the relay 203 to the line $L_2$.

The motor E continues to run until the disk D reaches the cutting position and the shoe 151 causes the normally open limit switch 148 to be closed, energizing a relay 201 having three sets of contacts, 201a, 201b, and 201c. Contacts 201a, which are normally closed, are opened when the relay 201 is energized, and the normally open contacts 201b and 201c are closed. The opening of the contacts 201a breaks the circuit to the relay 203, stopping the motor E, so that it cannot be started by again depressing the push button 200. The contacts 201b, when closed, energize the relay 201 independently of limit switch 148.

Wired in parallel with the relay 201 are two relays 204 and 205, having one set of normally open contacts 204a and 205a, respectively. When the relay 201 is energized, the relays 204 and 205 are energized at the same time, and the normally open contacts 204a and 205a are closed. The closing of the contacts 204a actuates a solenoid-operated valve 209 admitting air to the air cylinder 139 through hose 142, as shown in Fig. 9, so as to move the blowpipe 132 to its proper position for preheating the work W and to maintain it in that position. The closing of the contacts 205a actuates a solenoid-operated valve 210, supplying preheating gases to the blowpipe 132. The circuit for energizing the relays 201, 204, and 205 starts from the line $L_1$, and continues through the normally closed push button 213, and through the limit switch 148 to the relays 201, 204, and 205. After the relays 201, 204, and 205 become energized, the circuit is from the line $L_1$, through the push button 213, through the normally closed limit switch 155, through the contacts 201b, relays 201, 204, and 205, to line $L_2$.

After the preheat flames have heated the work W to the proper temperature for cutting, the cutting oxygen is turned on and the disk D rotated by momentarily depressing a push button 211, which energizes a relay 206 having three sets of normally open contacts, 206a, 206b, and 206c. The circuit for energizing the relay 206 is from the line $L_1$, through the contacts 201c closed by the previous energization of the relay 201, as described, and through relay 206 to line L₂. Energizing the relay 206 causes the normally open contacts 206a to close, and after the push button 211 is released, the circuit runs from the line L₁, through the normally closed push button 213, the normally closed limit switch 155, and the contacts 206a to the relay 206. The normally open contacts 206b are closed when the relay 206 is energized, and their closing in turn energizes the solenoid-operated normally closed valve 207, which turns on the cutting oxygen as shown in Fig. 14, and actuates the relay 208, which has two sets of normally open contacts 208a and 208b. The closing of the contacts 208a and 208b completes the circuit to the motor N which causes the disk D to rotate. The closing of the normally open contacts 206c again completes the circuit to the relay 203 and therefore again starts the motor E to feed the disk D to the work W as the cut progresses through the work.

When the work is cut through, and the disk is returned to the starting position, the limit switch 155 is opened by the projection 154 on the member S, and the circuit is broken, the motors N and E stopping by opening relay 206, and the flow of cutting oxygen and preheating gases being shut off by the closing of valve 207, and the opening of relay 205. If at any time during the cutting operation it is desired to stop the machine, the circuit may be broken by depressing the normally closed push button 213. When the machine is stopped in such manner, the disk D is partially within the cut in the work W. In order to remove it from that position, the motor E is reversed by depressing the normally open push button 212 which causes a relay 202 (provided with three sets of contacts, 202a, 202b, and 202c) to be energized. The contacts 202a are normally closed, and the contacts 202b and 202c are normally open. When the relay 202 is energized, the contacts 202a open, and the contacts 202b and 202c close, causing the motor E to run in the reverse direction as long as the push button 212 is depressed. The circuit for energizing the relay 202 is from the line L₁, through the push button 212 and the normally closed contacts 203a of the relay 203, through relay 202 to line L₂.

Normally closed contacts 203a of the relay 203, and normally closed contacts 202a of the relay 202 are provided in the circuit as safety measures. Thus, when the relay 203 is energized, causing the motor E to run in a forward direction, the contacts 203a are opened, and it is impossible to close the circuit for energizing the relay 202 to run the motor E in the reverse direction. Similarly, when the relay 202 is energized for running the motor E in the reverse direction, the contacts 202a are opened, and the relay 203 may not be energized to operate the motor in a forward direction.

The design of the cutting disk D may be varied somewhat over that disclosed in Fig. 9 without departing from the scope of the invention. As previously indicated, the teeth 134 formed about the periphery of the blade or disk D do not serve any useful purpose as far as the actual cutting action is concerned, but are advantageous in allowing space within the kerf for the forward flow of slag and other molten products formed during the cutting operation. Furthermore, the teeth 134, shown in Fig. 9, may be helpful when drilling the passages 39, by presenting a flat surface substantially perpendicular to the drill, thereby assisting in the starting phase. However, as shown in Fig. 10, the teeth 134 may be omitted and the passages 39 may be drilled inwardly directly from the periphery of a circular disk D.

A modified rotatable oxygen saw blade is disclosed in Figs. 11 and 12, wherein the blade comprises a disk D' substantially of the type disclosed in Figs. 9 and 13. The blade is preferably made of solid copper or Muntz metal having a drilled substantially radial passage 117 extending toward each of the teeth 134 formed on the periphery of the disk. An angular passage 39' extends therefrom in a generally tangential direction and is tapered at the discharge end to frictionally hold a tubular insert or nozzle 50. Each nozzle 50 may be bent slightly at approximately its mid-section, so that by twisting each nozzle in its seat, the flame-cutting jet projected therefrom may be given a lateral component of motion. Successive circumferentially disposed nozzles 50 may be shifted in opposite directions so that alternate jets attack opposite walls of the kerf to provide sufficient clearance to admit the disk D'. The nozzles 50 may be provided with cylindrical bores but preferably are drilled and subsequently reamed with a Zobel type reamer. If desired, the flame-cutting jets issuing from the periphery of the rotating disk may be made to diverge by the use of flared discharge openings of the type disclosed in Fig. 8. Otherwise each of the teeth 134 may be provided with a pair of discharge passages 51 branching outwardly from each radial passage 117 at a slight angle away from the central plane of the blade D as indicated in Fig. 13 to widen the kerf.

In the modification illustrated in Figs. 11 and 12, the use of a plurality of separately operated valves, as illustrated in Fig. 9, is avoided; instead, a single rotary slide valve P' functioning in a manner similar to the valving means P disclosed in Fig. 1 is employed. Use is made of a rotatable shaft 124 to which the disk D' is clamped in any convenient manner, for example as disclosed in Fig. 12. The respective radial passages 117 terminate in short inlet passages 127 extending transversely of the disk adjacent to the inner periphery thereof. An oxygen inlet housing 131 is journalled to the shaft 124 by means of bearings 130 and is provided with an annular chamber or oxygen manifold 129 communicating with the cutting oxygen inlet tube 128. The oxygen inlet tube connects with a suitable source of oxygen supply and is secured in any convenient manner with respect to the frame of the machine to secure the housing 131 from rotating when the disk D' rotates. Oxygen flows from the manifold 129 through an arcuate port 125 in the side wall of the manifold 129 to any inlet passages 127 that are open to the arcuate port 125. The flow of oxygen is thus continuously limited to only the nozzles whose passages 117 are in communication with the port 125. The size of the arc enclosed by the port 125 is determined by the desired length of jet travel at the periphery of the disk, that is, the size of the work to be cut. For a given path of travel, the arc size will be dependent upon the diameter of the disk D', but ordinarily is less than 180°. The position at which the oxygen jets are turned on may be varied by shifting the position of the inlet tube 128 about the axis of the shaft 124, thereby altering the position of the port 125. The port 125 is preferably designed so as to admit oxygen to each nozzle 50 as it approaches the work, and to interrupt the flow of oxygen immediately after each nozzle has traversed the desired path of travel.

Although the rotating type saw blade is air-cooled to a great extent, it has been found desirable to provide additional cooling. If desired, the disk may be provided with internal cooling passages of the type disclosed in connection with the reciprocating type of saw blade, shown in Fig. 1. A simpler method, however, comprises projecting a cooling medium such as air or water from small apertures formed along a closed tube 153, located directly against one or both side walls of the disk. Such a tube connects with a suitable source of supply under pressure (not shown) and is mounted adjacent to one or both sides of the disk D in a general radial direction so as to project fine streams of the cooling fluid against the outside wall of the disk as shown in Figs. 9 and 14.

If the work W is already at an ignition temperature, as may be the case when the work is taken directly from an annealing furnace or when it passes immediately from a rolling mill, no additional preheat may be necessary. Where preheating or supplementary preheating is necessary, a single blowpipe, mounted as shown in Fig. 1 or 9 so as to direct the heat against the starting edge is ordinarily sufficient. Better results are obtainable with a single preheating blowpipe than with separate preheating orifices adjacent to the respective cutting nozzles 50 or discharge passages 39, as the presence of inflammable mixtures within the kerf during operation contaminates the cutting gas and lowers the cutting efficiency. Where further preheat is necessary, two or more blowpipes 132 of the type disclosed in Fig. 9 may be mounted adjacent to the disk D on opposite sides of the kerf, with the heat directed along the top or side surface as desired.

As shown in Figs. 17, 18, and 19, the traversing motion of the jets may follow a substantially horizontal path, typified by the arrangements disclosed in Figs. 1 and 9, or the jets may follow either a generally vertical path, or a diagonal path at some intermediate angle between the vertical and the horizontal. By reorienting the blade-supporting structure shown in Fig. 1, the reciprocating blade may be made to operate vertically or at any desired intermediate angle. If the cut is made with a rotating blade, the direction of the traversing motion of the jets with respect to the work depends upon the position of the work relative to the disk D. Horizontal and vertical cuts, as shown in Figs. 17 and 18, are formed by locating the work W in substantial alignment with the vertical and horizontal diameters respectively of the disk D, while the diagonal cut shown in Fig. 19 is obtained by locating the work at an intermediate position on the periphery of the disk D. In any case, the jets traverse the work in the direction of the path of travel at a relatively high velocity $V_t$. The jets are swept along the kerf by being propelled in a path substantially parallel to the front or advancing wall Q thereof at high speed, preferably well above 100 feet per minute. The jets, which are substantially aligned with respect to the kerf, are preferably inclined forwardly in the direction of jet motion, for example at an angle of from 10° to 70° with the forward wall Q, which better adapts them to groove out successive thin layers in rapid succession. The operation takes place more efficiently if the nozzles 50 are fed or advanced within the kerf K at the rate at which the kerf is formed, thereby maintaining a substantially constant distance between the discharge end of the nozzles 50 and the front of the kerf. With the apparatus illustrated in Figs. 1 and 9, this result is obtained by moving the blade downwardly at a velocity $V_c$, either at a constant rate, for example, as by means of a cam Z, as shown in Fig. 9, or intermittently as by means of a pawl and ratchet mechanism as shown in Fig. 1. The blade-feeding velocity $V_c$ corresponding to the cutting rate, is experimentally determined from the traversing velocity of the jets, the temperature of the metal, and the degree of forward inclination and the discharge velocity of the jets. The cutting velocity $V_c$ occurs at substantially right angles to the traversing velocity $V_t$ of the jets, and is substantially independent of the length of the path of travel. Where the cuts are made with a rotatable disk forming a vertical or diagonally inclined advancing wall Q, as shown in Figs. 18 and 19, the axis of rotation may be translated and the nozzles 50 may be advanced within the kerf conveniently by mounting a disk of the type shown in Figs. 10, 12, or 13 on a self-propelled carriage such as a portable blowpipe apparatus of the general type shown in the previously mentioned Bucknam and Miller patent and advancing the carriage in a horizontal direction at a rate $V_c$ equal to the cutting speed.

Although similar results have been obtained with both reciprocating and rotatable types of saw blades, the latter exhibits certain advantages from the standpoint of simplicity of design and operation over the former. Excellent results have been obtained in the laboratory with a blade approximately 16 inches in diameter and $\frac{1}{16}''$ thick, having 24 teeth, rotating at a speed of between 150 and 200 R. P. M. The diameter of the blade may be extended to accommodate larger work, and if increased to six feet or more would allow conveniently cutting sections over 30 inches thick. If the advancing edge Q is inclined downwardly in the direction of jet travel, the flow of slag over the uncut portion is encouraged and more efficient preheating is obtained.

The principles of the invention as set forth in the present specification may be modified and applied to other forms of apparatus without departing from the scope of the invention or sacrificing its advantages.

I claim:

1. A method of thermo-chemically cutting preheated metal, comprising projecting a narrow stream of oxidizing cutting gas against the metal; recurrently sweeping said stream along the metal in an arcuate path coplanar with the central plane of the cut; and translating said stream continually in a direction generally normal to the sweeping motion of said stream and toward said metal but coplanar with said arcuate path.

2. A method of flame-cutting a preheated metal body comprising projecting successively adjoining series of substantially aligned cutting oxygen jets recurrently along a predetermined path of travel, whereby each of said jets successively removes a layer of metal along the entire length of said path.

3. A method of thermo-chemically cutting a metal body, comprising projecting a series of oxidizing jets against said body from circumferentially disposed nozzles, said jets being substantially aligned with the central plane of the kerf to be formed in said body; whirling said nozzles about a central axis normal to said plane of said kerf to sweep said jets in an arcuate path along the metal body to form a kerf therein; and progressively translating said axis to move said nozzles within said kerf.

4. A method of forming a kerf in a metal body, comprising projecting jets of oxidizing cutting gas against said body from a series of closely spaced nozzles located circumferentially about and directed outwardly from an axis; substantially aligning said nozzles with the desired line of cut; and rapidly rotating said nozzles about said axis, whereby said jets of oxidizing cutting gas from successive nozzles recurrently are swept completely along the line of cut to form said kerf.

5. A method as claimed in claim 4, including inclining said respective nozzles so as to project said jets forwardly in the direction of jet travel and outwardly slightly from tangents extending from the circumference about which said nozzles are located.

6. A method as claimed in claim 4 wherein said cutting gas is projected from said nozzles as a plurality of jets, at least some of said jets diverging slightly outwardly in a lateral direction from the central plane of the cut so as to be projected against the walls of said kerf, and at least some of said jets issuing from said nozzles outwardly at an acute angle to tangents extending from the circumference.

7. A method of flame-cutting a metal body, comprising projecting a catenation of substantially aligned cutting oxygen jets against said body along the line of cut; applying localized preheating flames continuously adjacent to one end of said line of cut at a point spaced sufficiently from said jets to inhibit contamination of said jets by said flames; providing recurrent relative motion between said body and said jets along the line of cut, the capacity of said jets being sufficiently low, and the rate of relative motion sufficiently high that each of said jets successively grooves out but a thin layer of metal along the line of cut; and progressively moving said catenation of jets within said cut as said cut is formed.

8. A method as claimed in claim 7 wherein the respective jets are inclined forwardly in the direction of motion of said jets relative to said body.

9. A method of flame-cutting a metal plate, comprising projecting successive chain-like series of substantially aligned flame-cutting jets recurrently against and progressively along a fixed path on said plate to form a kerf therein; and feeding said jets toward the forward kerf wall in the plane of said kerf substantially at right angles to such progressive motion of said jets at a rate corresponding to the rate at which said jets remove successive layers from the forward wall of said kerf.

10. A method of flame-cutting a preheated metal body, comprising projecting a catenation of aligned flame-cutting jets against the top surface of said body in a plane containing the line of cut; providing relative motion between said jets and said body along a line of cut sloping downwardly in the direction of jet motion, each of said respective jets thereby removing a thin layer of metal from successive portions of said body along substantially the entire line of cut to form a kerf therein, such layers being removed along a path generally inclined from the horizontal.

11. A method of flame-cutting a metal body, comprising projecting catenated substantially aligned gaseous-cutting jets against a surface of said body at closely spaced points along the path of travel; providing relative motion between said jets and said body, whereby successive groups of jets pass along the kerf while removing thin layers of metal from the forward wall thereof; and interrupting the flow of cutting gas to said jets successively as they move past the end of said kerf.

12. A method of flame-cutting a metal body comprising projecting catenated substantially aligned gaseous-cutting jets against a surface of said body, said jets being inclined within substantially the central plane of the cut to be formed in said body; reciprocating said jets relative to said body with a backward and forward movement along substantially the entire line of cut, said gaseous jets being projected against said body when moving forwardly in the direction of inclination, and the flow of gas to said jets being interrupted when said jets move backwardly.

13. Device for cutting metal comprising means for preheating a metal workpiece; a plurality of substantially aligned closely spaced oxygen passages; means for supplying oxygen to said passages; driving means for repeatedly presenting oxygen jets from said passages in rapid succession to the metal along a path of travel on said metal workpiece; and means for shutting off the oxygen jet from each successive oxygen passage after said jet has passed said metal workpiece.

14. Device for cutting a metal body comprising a plurality of aligned oxygen passages; valving means for supplying oxygen to each of said passages; means for discharging oxygen jets from said oxygen passages against said metal body; means for moving the said oxygen passages in rapid succession relatively to the metal body along a path of travel; means for operating said valving means to turn on each oxygen jet as it reaches the beginning of said path of travel on said body and to shut off the oxygen jet from each successive oxygen passage after said passage has passed the metal body; and means for moving said oxygen passages toward said metal body and within the cut, as the cutting operation progresses.

15. In combination, means for projecting a plurality of aligned oxygen jets against a preheated metal workpiece; means for moving said jets repeatedly in a line across said metal workpiece; and means for shutting off each successive oxygen jet after it has travelled a predetermined distance across the metal workpiece, and for turning on each successive oxygen jet when it returns to the beginning of said line.

16. Apparatus for removing metal from a preheated metal workpiece, comprising a rotatable disk provided about its periphery with a plurality of outwardly extending closely adjacent gas passages each adapted to present a gas jet to the surface of the metal to be removed; means for rapidly rotating said disk to project each of said jets recurrently along the entire path of travel on said workpiece; and means for supplying cutting gas to said gas passages.

17. Cutting apparatus comprising a blade for removing metal from a preheated metal workpiece to form a cut therein, said blade having a series of substantially aligned discharge orifices along one edge thereof, each of said orifices having a cutting gas supply passage and being adapted to present a flame-cutting jet to the surface of the metal to be removed; means for propelling said blade over said work; and means for moving said blade within said cut as said cut is formed.

18. Cutting apparatus comprising a rotatable disk for removing metal from a preheated metal workpiece, said disk having teeth on its periphery, each of said teeth having a gas passage adapted to present an oxygen jet to the surface of the metal to be removed; means for rotating said disk; means for supplying oxygen to said gas passages; and means for interrupting the flow of gas in each successive passage after such passage has passed the surface of said workpiece.

19. Device for cutting preheated metal comprising a blade, said blade being provided along an edge thereof with a plurality of oxygen passages adapted to present successive oxygen jets to the surface of metal to be cut, such respective oxygen passages being located adjacent to but on opposite sides of the central plane of said blade; means for propelling said blade along said work; means for supplying oxygen to said oxygen passages; and means for shutting off each successive oxygen jet after it has passed the surface of the metal to be cut.

20. Metal cutting apparatus comprising a blade having a toothed edge, substantially each tooth having an oxygen passage therein adapted to discharge an oxygen jet against a metal workpiece to be cut; means for providing continual relative motion between said blade and said workpiece in the central plane of said blade; means for supplying oxygen to said oxygen passages; means for shutting off the oxygen jet from each successive oxygen passage after it has passed the surface of said metal workpiece; and means for moving said blade toward and away from said metal workpiece.

21. Apparatus for flame-cutting a metal body comprising a headpiece, said headpiece being provided with aligned passages for projecting inclined coplanar flame-cutting jets against said metal body at spaced points along the desired path of travel; means for providing relative motion between said headpiece and said metal body substantially in the central plane of said jets to propel each of said jets in the direction of its inclination recurrently along the entire kerf formed in said metal body; and means for feeding said headpiece more deeply within said kerf as said kerf is formed.

22. Cutting apparatus comprising a rotatable disk for removing metal from a preheated metal workpiece, said disk having on its periphery a plurality of gas passages adapted to present a flame-cutting jet to the surface of the metal to be removed, said respective gas passages projecting slightly outwardly in opposite directions from the central plane of said disk; and means for rotating said disk.

23. Device for cutting or removing metal, comprising a rotatable member; means for rotating said member, said member being provided at spaced points about its periphery with a plurality of oxygen passages, each having an outlet adapted to project an oxygen jet recurrently against said metal along a desired path of travel thereon as said member is rotated; and valving means adapted to conduct cutting oxygen to each of said passages successively during the portion of each period of rotation that said jets pass adjacent to the metal, and to shut off the flow of cutting oxygen to said passages successively during the remaining portion of each period of rotation.

24. Apparatus for cutting metal comprising means for preheating a metal workpiece adjacent to a line of cut; jet-projecting means adapted to discharge successive series of cutting oxygen jets against said metal; means for propelling continuously such successive series of jets rapidly along said line of cut to form a progressively deeper kerf in said metal; and means for feeding said jet-projecting means within said kerf as said kerf progressively deepens.

25. Apparatus for flame-cutting preheated metal, comprising jet-projecting means adapted to discharge inclined substantially coplanar cutting-oxygen jets at points spaced along the entire path of travel on said metal; means for sweeping said jets in continuously-successive series in the direction of their inclination recurrently along said entire path of travel to form a kerf progressively in said metal; and means for feeding said jet-projecting means within said kerf as said kerf progressively forms.

HOMER W. JONES.